(12) United States Patent
Gray et al.

(10) Patent No.: US 12,593,815 B2
(45) Date of Patent: Apr. 7, 2026

(54) ANIMAL MANAGEMENT SYSTEM

(71) Applicant: Kennel Automation LLC, Greenfield, IN (US)

(72) Inventors: Dan W. Gray, Greenfield, IN (US); John Wolken, Greenfield, IN (US)

(73) Assignee: KENNEL AUTOMATION LLC, Greenfield, IN (US)

( * ) Notice: Subject to any disclaimer, the term of this patent is extended or adjusted under 35 U.S.C. 154(b) by 0 days.

(21) Appl. No.: 19/200,633

(22) Filed: May 6, 2025

(65) Prior Publication Data

US 2025/0338817 A1 Nov. 6, 2025

Related U.S. Application Data

(60) Provisional application No. 63/643,380, filed on May 6, 2024.

(51) Int. Cl.
A01K 1/03 (2006.01)
E05F 15/77 (2015.01)

(52) U.S. Cl.
CPC .............. A01K 1/034 (2013.01); E05F 15/77 (2015.01)

(58) Field of Classification Search
CPC ........................................................ A01K 1/034
See application file for complete search history.

(56) References Cited

U.S. PATENT DOCUMENTS

| | | | | | |
|---|---|---|---|---|---|
| 2,865,610 | A | * | 12/1958 | Sparrow | F24F 11/62 165/262 |
| 3,718,120 | A | * | 2/1973 | Schwarz | A01K 1/034 119/843 |
| 3,791,348 | A | * | 2/1974 | Marnett | A01K 1/0135 119/482 |
| 3,895,606 | A | * | 7/1975 | Galloway | A01K 1/034 119/498 |
| 3,951,106 | A | * | 4/1976 | Wright | A01K 1/034 119/482 |
| 5,247,901 | A | * | 9/1993 | Landon | A01K 1/031 119/419 |
| 5,872,516 | A | | 2/1999 | Bonge, Jr. | |

(Continued)

FOREIGN PATENT DOCUMENTS

| | | |
|---|---|---|
| CN | 108633759 A | 10/2018 |
| CN | 110367137 A | 10/2019 |

*Primary Examiner* — Monica L Perry
*Assistant Examiner* — Brittany A Lowery
(74) *Attorney, Agent, or Firm* — Burdick Patents, P.A.; Sean D. Burdick; Colin L. Honan

(57) ABSTRACT

An animal management system includes a facility having an interior shelter, an enclosed exterior, and automated controls. The interior shelter includes multiple kennels all having access to an aisle through which animals are introduced to the kennels. The enclosed exterior includes a run accessible from each kennel via a motorized interior door, and a segmented yard accessible from each run via a motorized external door. A main controller and local controllers are electrically coupled to actuators to allow an operator to remotely open and close any of the doors. Electrical and mechanical interlocks prevent simultaneous actuation of any one door by more than one of the main controller and the local controllers. A main computer can run customizable algorithms to command the controllers to automate animal egress among kennels, runs, and yard segments.

19 Claims, 9 Drawing Sheets

(56) References Cited

U.S. PATENT DOCUMENTS

| | | | |
|---|---|---|---|
| 6,141,911 A | 11/2000 | Reid | |
| 6,481,156 B1 * | 11/2002 | Richmond | A01K 1/034 |
| | | | 49/24 |
| 6,691,463 B1 * | 2/2004 | Richmond | A01K 1/0017 |
| | | | 49/169 |
| 10,750,713 B2 * | 8/2020 | Rathman | A01K 1/015 |
| 11,197,463 B2 | 12/2021 | Burton et al. | |
| 12,082,559 B1 * | 9/2024 | Li | E05F 15/78 |
| 2004/0031446 A1 * | 2/2004 | Harrison | A01K 1/034 |
| | | | 119/480 |
| 2004/0069239 A1 * | 4/2004 | Chun | A01K 1/0103 |
| | | | 119/444 |
| 2007/0146958 A1 * | 6/2007 | Babcock | H02P 7/281 |
| | | | 361/160 |
| 2012/0109695 A1 * | 5/2012 | Forkhamer | A01K 1/03 |
| | | | 705/5 |
| 2012/0266540 A1 | 10/2012 | Noyes | |
| 2013/0132135 A1 * | 5/2013 | Galeone | A01K 1/0047 |
| | | | 119/449 |
| 2013/0192532 A1 * | 8/2013 | Ganahl | A01K 1/034 |
| | | | 119/474 |
| 2013/0233683 A1 * | 9/2013 | Matsumoto | H03K 17/968 |
| | | | 200/43.11 |
| 2014/0182518 A1 * | 7/2014 | Boehm | A01K 31/007 |
| | | | 119/429 |
| 2019/0010745 A1 * | 1/2019 | Taylor | E05C 19/007 |
| 2019/0098874 A1 * | 4/2019 | Burton | A01K 29/005 |
| 2021/0324672 A1 | 10/2021 | Altiner et al. | |
| 2024/0341265 A1 * | 10/2024 | Bubear | A01K 1/034 |
| 2024/0381849 A1 * | 11/2024 | Forsythe | A01K 29/005 |
| 2025/0043616 A1 * | 2/2025 | Miller | E06B 7/32 |
| 2025/0194560 A1 * | 6/2025 | Mallor | A01K 1/0245 |

* cited by examiner

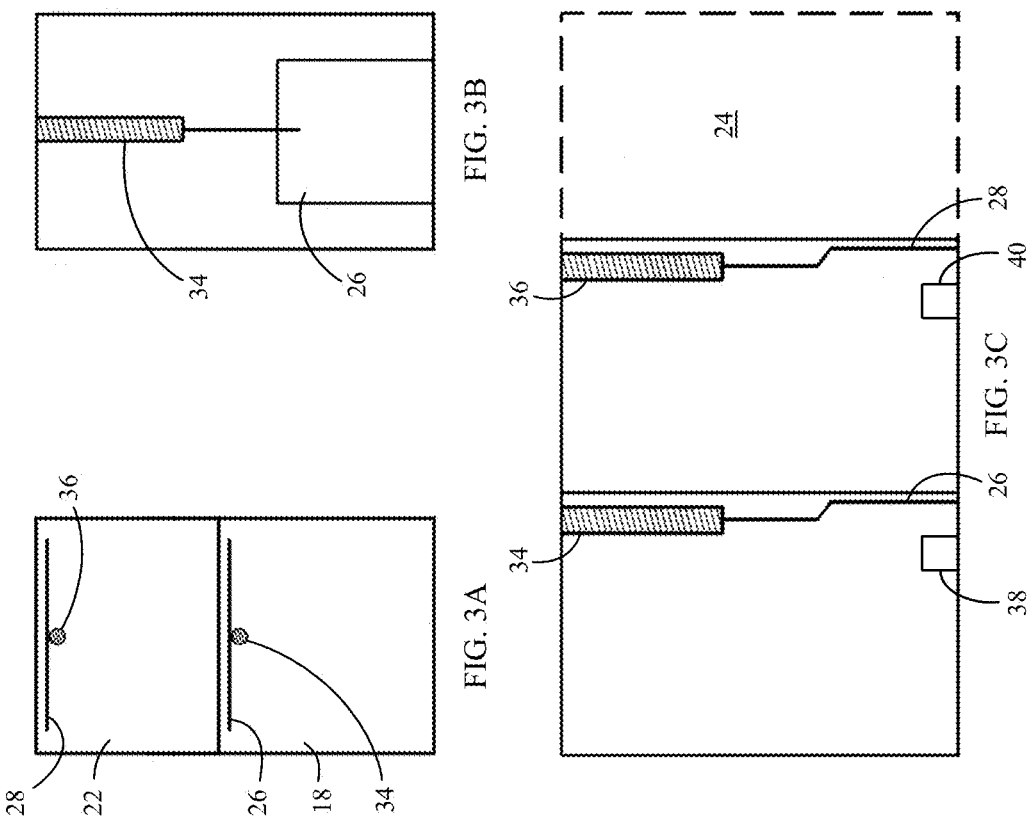

1.
Joystick Switch Locations
Center Kennel Aisle
2. Exterior Run Wall
3. Play Yard Sidewalk

ANIMAL MANAGEMENT SYSTEM

RELATED APPLICATIONS

This application claims priority to and is a continuation of U.S. Provisional Application No. 63/643,380 filed May 6, 2024, the contents of which are incorporated herein by reference.

BACKGROUND OF THE INVENTION

Field of the Invention

The present application relates generally to an animal management system, more specifically to a system of remotely controllable enclosures for housing animals, and most specifically to an automated kennel system for housing dogs.

Description of Related Art

Most commercially operated animal kennels are designed to accommodate household pets, such as dogs and cats. The individual kennels used to confine the animals take on a variety of shapes and sizes, owing mainly to the prevalence of non-standardized structures used for that purpose. At any such commercial operation, the kennels may in some cases consist of professionally made crates or cages, or customized enclosures made from chain link fence or other common construction materials, or home made structures cobbled together from whatever material is on hand or readily available at a local hardware store, or from various combinations of all of these types of enclosures. Little thought, if any, is given to customizing the overall architecture of the kennel facility. Commercial kennels tend to occur in structures that were originally built for an entirely different purpose, and later converted for use as animal housing.

Commercial kennels are for the most part labor intensive manual operations. Housed animals need to be treated with care by human workers and safely segregated from other animals in the same facility. Much individual attention may be devoted to each animal, including petting, comforting, grooming, examining, medicating, feeding, watering, cleaning, liberating, corralling, and exercising. At larger facilities that house many dozens of animals, the total man-hour burden adds significant costs and inefficiencies to the overall management operation. Similar problems arise in any facility that houses large numbers of animals, including veterinarian hospitals, zoos, and animal research facilities.

What is needed is an improvement in the design of an animal management system that improves efficiency and scalability.

SUMMARY OF THE INVENTION

The present invention advances the art of animal management systems by providing a specialized physical layout in combination with specialized automatic controls that improve the overall efficiency, comfort, and safety of a facility that manages large numbers of animals. The invention uses a centralized programmable control system to assist with automatic and manual control of egress doors, enclosure sanitation, weather response, yard maintenance, and other functions as disclosed herein.

In general, the invention may be applied to management systems for many different species of animals, and for a variety of purposes. While exemplary embodiments of the invention herein are shown and described primarily in the context of dog kennels, the invention may also be applied, for example, for housing and controlling cats, horses, pigs, sheep, goats, cattle, chickens, and other pets and animals commonly found in households and on farms; for housing wild animals or endangered species under control in a zoo or in a laboratory for scientific study, such as wolves, foxes, bison, bears, rodents, etc., or for housing and control of pets in general, whether conventional or exotic, in veterinary hospitals or research facilities.

Terms used herein should be given their plain and ordinary meaning. The term controller should be interpreted to include at least microprocessors and programmable logic controllers. The term motorized means should be interpreted to include at least electric motors, linear actuators, hydraulic actuators, and pneumatic actuators. The term sensor should be interpreted to include any instrument that detects physical or measurable phenomena, such as time, temperature, humidity, precipitation, heat, smoke, carbon monoxide, pressure, flow, voltage, current, light, weight, movement, etc. The term exceeds should be interpreted to mean that a measured parameter is either higher or lower than a setpoint. Power supplies that are normally required for energizing equipment described herein, e.g. motors, valves, pumps, sensors, heaters, etc. may be realized using common and readily available sources such as 120 VAC power or 12 VDC batteries with or without an inverter.

According to one embodiment of the present invention, an animal management system is provided with automated controls. The animal management system has an interior shelter and an enclosed exterior perimeter. Within the interior shelter there is a first kennel, at least one second kennel, and an aisle adjacent to the first kennel and the at least one second kennel. The enclosed exterior perimeter includes a first run, at least one second run, and a yard accessible by each of the first run and the second run. An interior door separates the first kennel from the first run and an exterior door separates the first run from the yard. The system includes a main controller and one or more local controllers. Each controller is configured to actuate the interior door and the exterior door. The system also includes at least one interlock that prevents the simultaneous actuation of any door by more than one of the main controller and the one or more local controllers.

In preferred embodiments, the interior shelter includes a plurality of kennels arranged along the aisle. Each of the plurality of kennels has access to a corresponding run within the enclosed exterior perimeter. Preferably, each of the plurality of kennels has an interior door separating that kennel from its corresponding run. Similarly, each of the runs includes an exterior door separating that run from the yard. Each of these interior doors and exterior doors are configured to be actuated by the main controller and the one or more local controllers.

In preferred embodiments, the main controller is located within the interior shelter, for example, in a control room located at one end of the interior shelter. The one or more local controllers may be located throughout the interior shelter and the enclosed exterior perimeter. In one embodiment, a first local controller is located within the interior shelter at an end opposite the main controller. A second local controller may be located along a wall of a run and a third local controller may be located within the yard. In some embodiments, each of the one or more local controllers may be a joystick controller having four positional controls. Each of the four positional controls corresponds to a specific actuation command for the interior door and the exterior door. For example, a first position of the joystick controller may actuate the interior door upward, a second position actuates the interior door downward, a third position actuates the exterior door upward, and the fourth position actuates the exterior door downward.

The interior door and the exterior door may also each include a sensor configured to detect the presence of an object within the door frame. The sensor, when detecting that an object is present, communicates with the main controller to prevent actuation of that door to prevent accidental closure on an animal.

In preferred embodiments, the interior door includes a linear actuator that is mechanically coupled to that door and electrically coupled to and configured to communicate with the main controller and the one or more local controllers. Similarly, the exterior door includes a linear actuator that is mechanically coupled to that door and electrically coupled to and configured to communicate with the main controller and the one or more local controllers.

One further embodiment of the present invention operates within the context of a building for housing animals, having an interior shelter and multiple exterior runs within an enclosed exterior perimeter. The invention provides an automated kennel control system having the following features: a controller that includes a processor and a programmable memory storing data readable by and one or more algorithms executable by the processor; a kennel that has an interior door and an exterior door, the interior door governing animal egress between the at least one kennel and a corresponding run, and the exterior door governing animal egress between the exterior run adjacent to the at least one kennel and a yard, the yard also found within the enclosed exterior perimeter; a first motorized means that enables remote operation of the interior door by the main controller; a second motorized means that enables remote operation of the exterior door by the main controller; and a sensor that is coupled to the controller and configured to sense an event that signals the controller to operate one or both of the interior and exterior doors.

An animal management system according to the invention may include automated watering features that can automatically spray out the individual animal kennel and run unit to ensure the area has a level of cleanliness. The watering feature may be activated when the animal management system determines that there is no animal present in that kennel, i.e., the animal has been released into the run for its daily exercise, at which point the system may automatically spray out any waste produced by that animal. The watering feature is electrically coupled with the main controller, which provides the operator with remote control over such features. The watering feature may be activated by an operator manipulation of a user interface coupled to the main controller.

More elaborate embodiments of the aforesaid basic embodiment may include any of the following additional features. A sensor in the form of a user interface may be coupled to the main controller such that the event sensed by the main controller consists of operator manipulation of the user interface. A touch screen may be used as the user interface. A sensor in the form of a temperature sensor may be coupled to the main controller such that the event consists of a temperature sensed by the temperature sensor exceeding a preset temperature stored in the programmable memory. The temperature sensor may be mounted within the exterior run or on a roof of the interior shelter. A sensor coupled to the main controller may be a smoke detector such that the event consists of the smoke detector transmitting an alarm signal to the main controller. A sensor may be a carbon monoxide detector such that the event consists of the carbon monoxide detector transmitting an alarm signal to the main controller. The sensor may be a precipitation detector such that the event consists of the precipitation detector transmitting an alarm signal to the main controller. The sensor may be a clock coupled to the main controller such that the event consists of the clock measuring a time of day that triggers a timing setpoint stored in the programmable memory.

In another embodiment, the aforesaid basic embodiment may include a temperature sensor, a precipitation detector, and a clock, such that the event consists of (1) a temperature sensed by the temperature sensor exceeding a low preset temperature stored in the programmable memory, (2) the precipitation detector not transmitting an alarm signal to the controller, and (3) the clock measuring a time of day that triggers a timing setpoint stored in the programmable memory. In another implementation, the event may further consist of the sensed temperature not exceeding a high preset temperature stored in the programmable memory.

In another embodiment for use in a building for housing animals, an automated kennel control system is provided that includes a main controller having a processor and a programmable memory storing data readable by and one or more algorithms executable by the processor. A kennel is located within the building and has an interior door and an exterior door, the interior door governing animal egress between a building interior and the kennel, and the exterior door governing animal egress between the kennel and a building exterior. A temperature sensor is coupled to the controller. A means for heating a floor of the kennel, activatable by the main controller, is also provided, and may be a conventional heating element or coil. In this embodiment, the main controller is configured to activate the heating means in response to a temperature sensed by the temperature sensor exceeding a preset temperature stored in the programmable memory. The temperature sensor may be located in the building exterior.

In another embodiment, in a building for housing animals, having an interior shelter and an exterior run, an automated kennel control system is provided. The control system includes a main controller having a processor and a programmable memory storing data readable by and one or more algorithms executable by the processor, a louvered pergola at least partially covering the exterior run, a motorized means for rotating one or more louvers of the louvered pergola, and a sensor coupled to the main controller and configured to sense an event that signals the main controller to rotate the one or more louvers. In one variation of this embodiment, the event may be an environmental event. In another variation, the sensor may be a means for measuring precipitation, such that the main controller is configured to rotate the one or more louvers in response to the precipitation measuring means sensing a precipitation that exceeds a predetermined setpoint stored in the programmable memory. In another variation, the sensor may be a means for measuring wind speed, such as an anemometer, such that the main controller is configured to rotate the one or more louvers in response to the wind speed measuring means sensing a wind speed that exceeds a predetermined setpoint stored in the programmable memory. In another variation, the sensor may be a means for measuring temperature, such that the main controller is configured to rotate the one or more louvers in response to the temperature measuring means sensing temperature that exceeds a predetermined setpoint stored in the programmable memory.

In another embodiment of the invention for use in a building for housing animals, an automated kennel control system is provided that includes a main controller having a processor and a programmable memory storing data readable by and one or more algorithms executable by the processor. Also included is a kennel located within the building interior and having a gate and an interior door, the gate governing animal egress between a building interior and the kennel, and the interior door governing animal egress between the kennel and an animal run. A source of at least one liquid is provided for treating ground within the animal run. A conduit fluidically couples the source of the at least one liquid to a dispensing head within the animal run. A valve means, which may be one or more solenoid or motor-operated valves, is operatively coupled to the main controller and configured to enable and disable flow of the at least one liquid from the source to the dispensing head via the conduit. And, the one or more algorithms when executed by the main controller cause the at least one liquid to dispense into the animal run.

The embodiment of the preceding paragraphs may include many variations. For example, the one or more algorithms can be automatically activated by a timer or manually activated by an operator commanding the main controller by manipulating a user interface. The system may further include a pumping means operatively coupled to the main controller and fluidically coupled to the conduit. The dispensing head may be a shower head mounted above the ground and configured to dispense the at least one liquid in a spray pattern to cover walls and the ground within the animal run. Or, the dispensing head may be a high-pressure nozzle mounted at ground level at one end of the animal run and configured to flush the at least one liquid across substantially all of the ground within the animal run. In any of these embodiments, the liquid may be water, a sanitizing solution, or an enzyme solution, or any two of these, or all three, stored, for example, in drums or other vessels maintained in the building interior outside of the kennel or around the exterior of the building. In another implementation, that system may be configured to divert any one of the liquids through a common conduit. In another variation, the system may further include a blend box fluidically coupled to the conduit upstream of the dispensing head, such that the main controller by executing the one or more algorithms operates the valve means to cause two or more of the liquids to combine in the blend box.

Another embodiment of the invention provides an animal management system that includes a main building having an aisle or central corridor, one or more enclosed yards at least partially surrounding the main building, and a plurality of animal kennels, each located within the main building, each extending transversely from the central corridor, and each separated from the central corridor by a gate that can be manually or automatically operated. A plurality of enclosed runs each connect one of the animal kennels to one of the enclosed yards. Each animal kennel is separated from an enclosed run by a motorized interior door, and each enclosed yard is separated from the enclosed run by a motorized exterior door. Also provided is a main controller having a processor and a programmable memory storing data readable by one or more algorithms executable by the processor. The main controller is operable to command one or more of the gate, the interior door, and the exterior door to open or close by executing the one or more algorithms.

In another embodiment, the system described in that aforesaid paragraph also includes a source of at least one liquid for treating ground within the one or more enclosed yards, conduit fluidically coupling the source of the at least one liquid to a dispensing head directed toward the one or more enclosed yards, and valve means, as previously described, that is operatively coupled to the main controller and configured to enable and disable flow of the at least one liquid from the source to the dispensing head via the conduit, wherein the one or more algorithms when executed by the main controller cause the at least one liquid to dispense into the one or more enclosed yards. In preferred embodiments, each kennel and run unit includes its own liquid dispensing system to provide an automated cleaning option to each kennel and run unit. In one variation, a precipitation detector is provided, wherein the main controller, in response to the precipitation detector detecting precipitation higher than a predetermined level stored in the programmable memory, executes one or more of the algorithms to cause the at least one liquid to dispense into the one or more enclosed yards. In another variation, the one or more algorithms can be automatically activated by a timer or manually activated by an operator commanding the main controller by manipulating a user interface. In another variation, the system, may include a pumping means operatively coupled to the main controller and fluidically coupled to the conduit. In another variation, the dispensing head may be a sprinkler head configured to dispense the at least one liquid to cover the one or more enclosed yards. The at least one liquid may be water, a fertilizing solution, and an enzyme solution, or any two of these, or all three. The sanitizing solution and the enzyme solution may be stored in the main building outside of the animal kennels, in drums or other vessels or along an exterior wall of the main building. In another variation, the system may be configured to divert any one of the liquids through a common conduit.

In another variation of the aforesaid invention, the system may further include a blend box fluidically coupled to the conduit upstream of the dispensing head, wherein the main controller by executing the one or more algorithms operates the valve means to cause two or more of the liquids to combine in the blend box. The system may further include at least one sensor coupled to the main controller and configured to sense an event that signals the main controller to operate one or more of the gate, the interior door, and the exterior door. The sensor may be a user interface coupled to the main controller such that the event consists of operator manipulation of the user interface, which may be a touch screen, keyboard, mouse, or other manipulable computer readable device. In another embodiment, the sensor may be a temperature sensor such that the event consists of a temperature sensed by the temperature sensor exceeding a preset temperature stored in the programmable memory. The temperature sensor may be mounted outside of the main building. In another embodiment, the sensor may be a smoke detector such that the event consists of the smoke detector transmitting an alarm signal to the main controller. In another embodiment, the sensor may be a carbon monoxide detector such that the event consists of the carbon monoxide detector transmitting an alarm signal to the main controller. In another embodiment, the sensor may be a clock such that the event consists of the clock measuring a time of day that triggers a timing setpoint stored in the programmable memory.

In another embodiment of the invention described in preceding paragraphs, the aforesaid system may include a temperature sensor, a precipitation detector, and a clock, such that the event comprises: (1) a temperature sensed by the temperature sensor exceeding a low preset temperature stored in the programmable memory, (2) the precipitation detector not transmitting an alarm signal to the controller, and (3) the clock measuring a time of day that triggers a timing setpoint stored in the programmable memory. In one variation, the event may further comprise the sensed temperature not exceeding a high preset temperature stored in the programmable memory. In another variation, the aforesaid system may further include a temperature sensor coupled to the main controller, and a means for heating a floor of at least one of the animal kennels activatable by the main controller, wherein the main controller is configured to activate the heating means in response to a temperature sensed by the temperature sensor dropping below a preset temperature stored in the programmable memory. The temperature sensor may be located outside of the main building.

In another embodiment of the invention described in preceding paragraphs, the aforesaid system may further include a louvered pergola at least partially covering at least one of the enclosed runs, a motorized means for rotating one or more louvers of the louvered pergola, and at least one sensor coupled to the main controller and configured to sense an event that signals the main controller to rotate the one or more louvers. The event may be an environmental event. In another variation, the at least one sensor may be a means for measuring precipitation, and the main controller may be configured to rotate the one or more louvers in response to the precipitation measuring means sensing a precipitation that exceeds a predetermined setpoint stored in the programmable memory. In another variation, the at least one sensor comprises a means for measuring wind speed, and the main controller is configured to rotate the one or more louvers in response to the wind speed measuring means sensing a wind speed that exceeds a predetermined setpoint stored in the programmable memory. In another variation, the sensor comprises a means for measuring temperature, and the main controller is configured to rotate the one or more louvers in response to the temperature measuring means sensing temperature that exceeds a predetermined setpoint stored in the programmable memory.

According to the invention, any of the foregoing embodiments may include, as one of its algorithms stored in the memory, a learning algorithm configured to adjust one or more other of the algorithms based on empirical data stored in the memory that is representative of animal behavior. The data representative of animal behavior may be, for example, animal wake time data, animal sleep time data, animal energy expense rate data, animal noise level data, animal calorie consumption data, and animal water consumption data.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions disclosed or shown are exemplary only. In the drawings, like reference numerals may designate like parts throughout the different views, wherein:

8

Figure 1:
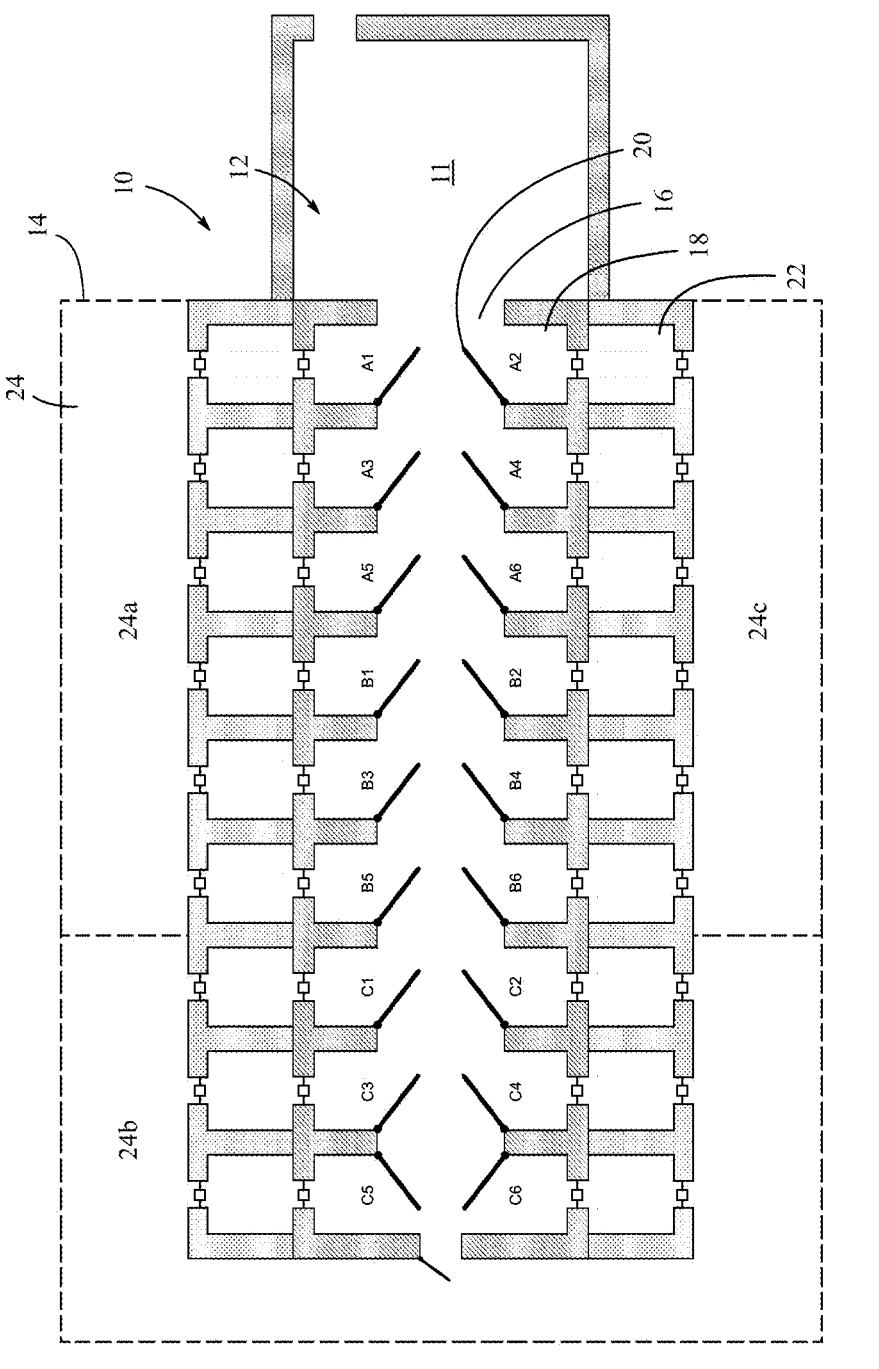

FIG. 1 is a plan view of one embodiment of a physical layout of a main building and surrounding yard for an animal management system according to the invention.

Figure 2:
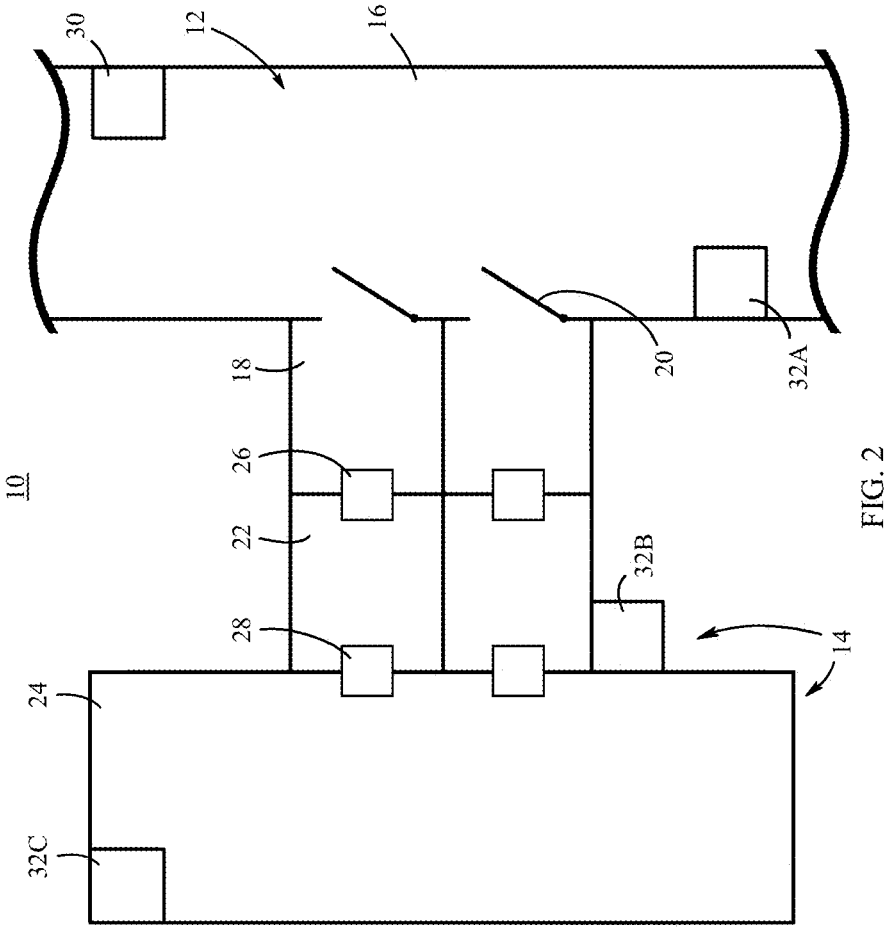

FIG. 2 is a simplified plan view of a main building for an animal management system according to one embodiment of the present invention.

FIG. 3A is a top view of an embodiment of an isolated kennel and run unit for an animal management system according to the present invention.

FIG. 3B is a front view of the kennel and run unit shown in FIG. 3A.

FIG. 3C is a side view of the kennel and run unit shown in FIG. 3A.

Figures 4A, 4B, 4C:
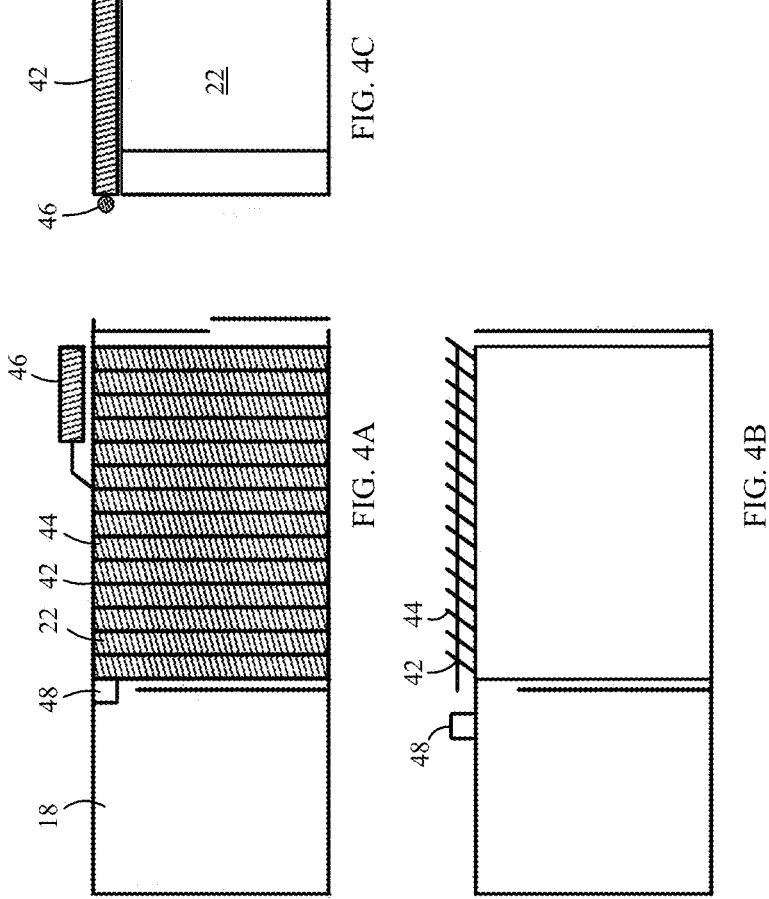

FIG. 4A is a top view of an alternative embodiment of a kennel and run unit having a louvered pergola for an animal management system according to one embodiment of the invention.

FIG. 4B is a side view of the kennel and run unit shown in FIG. 4A.

FIG. 4C is a rear view of the kennel and run unit shown in FIG. 4A.

Figure 5:
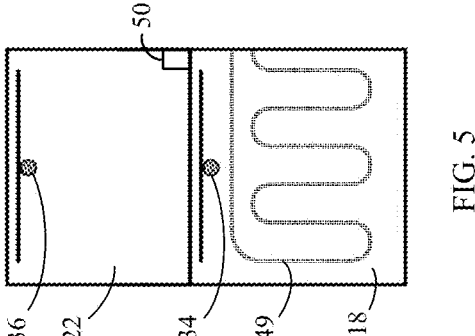

FIG. 5 is a top view of an isolated kennel and run unit having an integrated heating feature for an animal management system according to one embodiment of the present invention.

Figure 6:
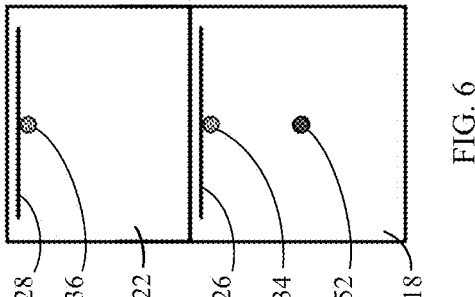

FIG. 6 is a top view of an isolated kennel and run unit having an integrated smoke and fire detection feature for an animal management system according to one embodiment of the present invention.

Figures 7A, 7B, 7C:
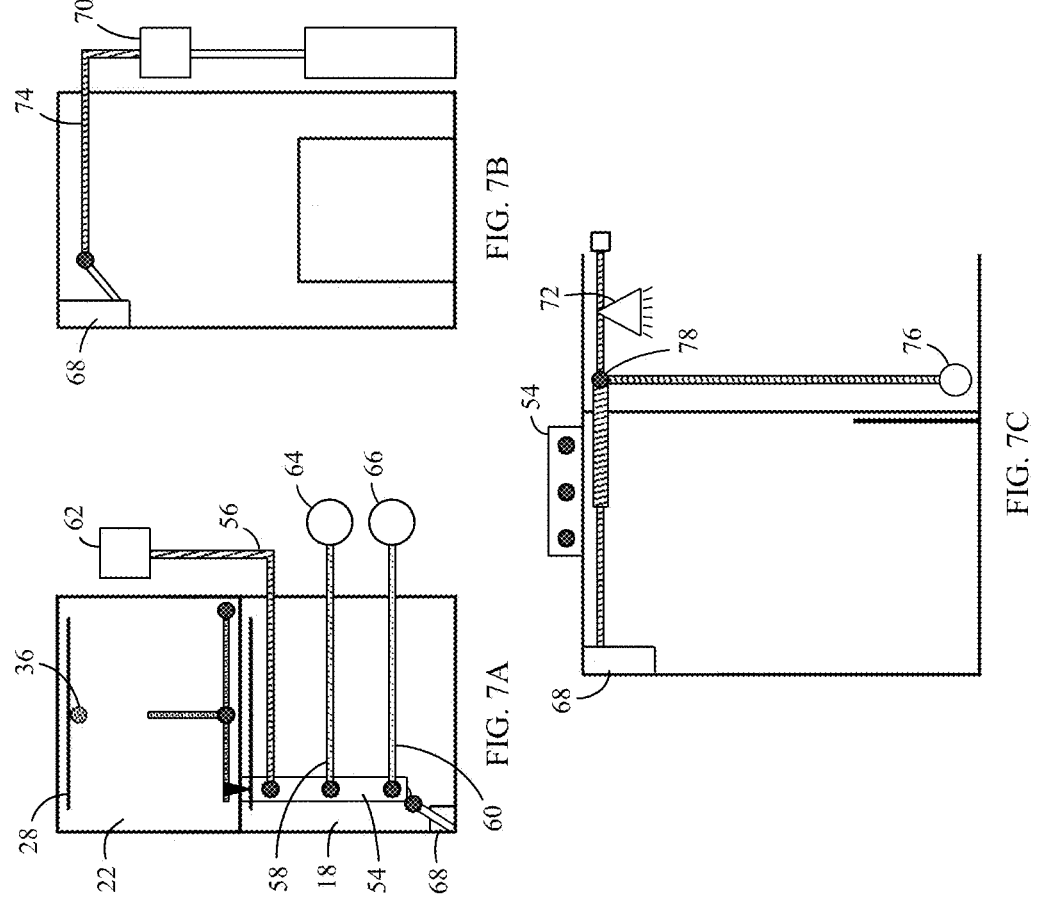

FIG. 7A is a top view of an isolated kennel and run unit having an integrated liquid delivery system for an animal management system according to one embodiment of the present invention.

FIG. 7B is a front view of the kennel and run unit shown in FIG. 7A.

FIG. 7C is a side view of the kennel and run unit shown in FIG. 7A.

Figure 8:
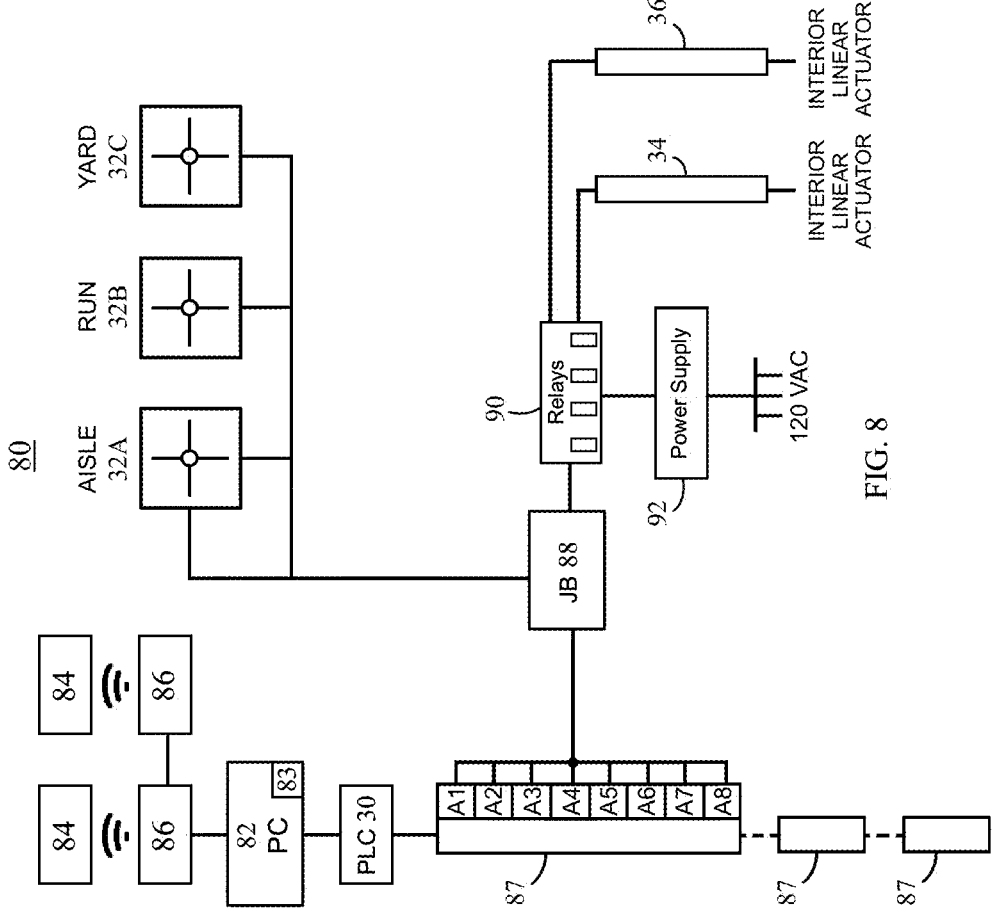

FIG. 8 is a block diagram of one embodiment of an egress door control system for an animal management system according to the present invention.

Figure 9:
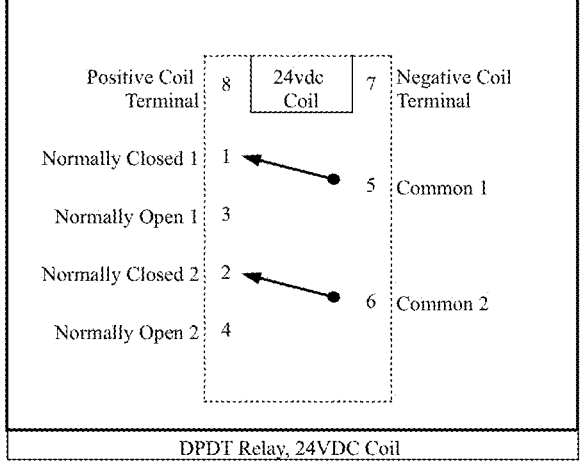

FIG. 9 is a schematic for a relay forming part of an egress door control system for an animal management system according to the present invention.

Figure 10:
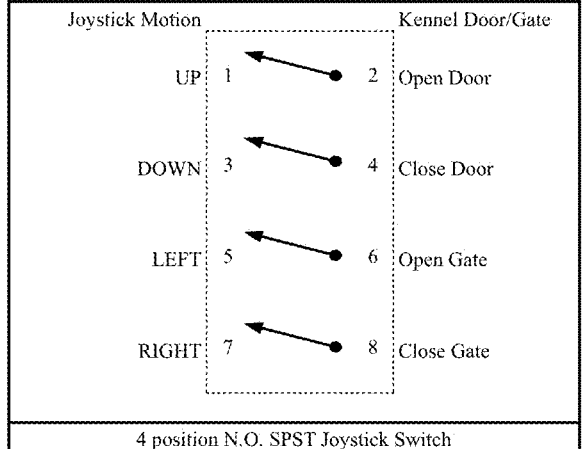

FIG. 10 is a schematic for a local controller usable in an animal management system according to the present invention.

Figure 11:
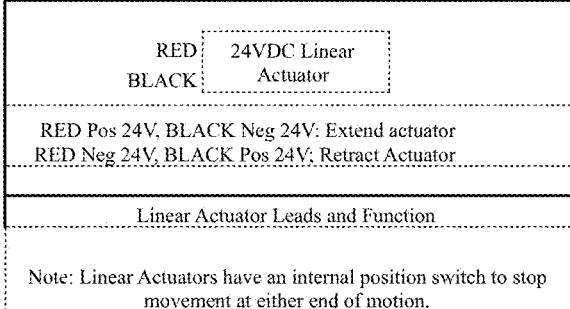

FIG. 11 is a block diagram for a linear actuator usable in an animal management system according to the present invention.

Figure 12:
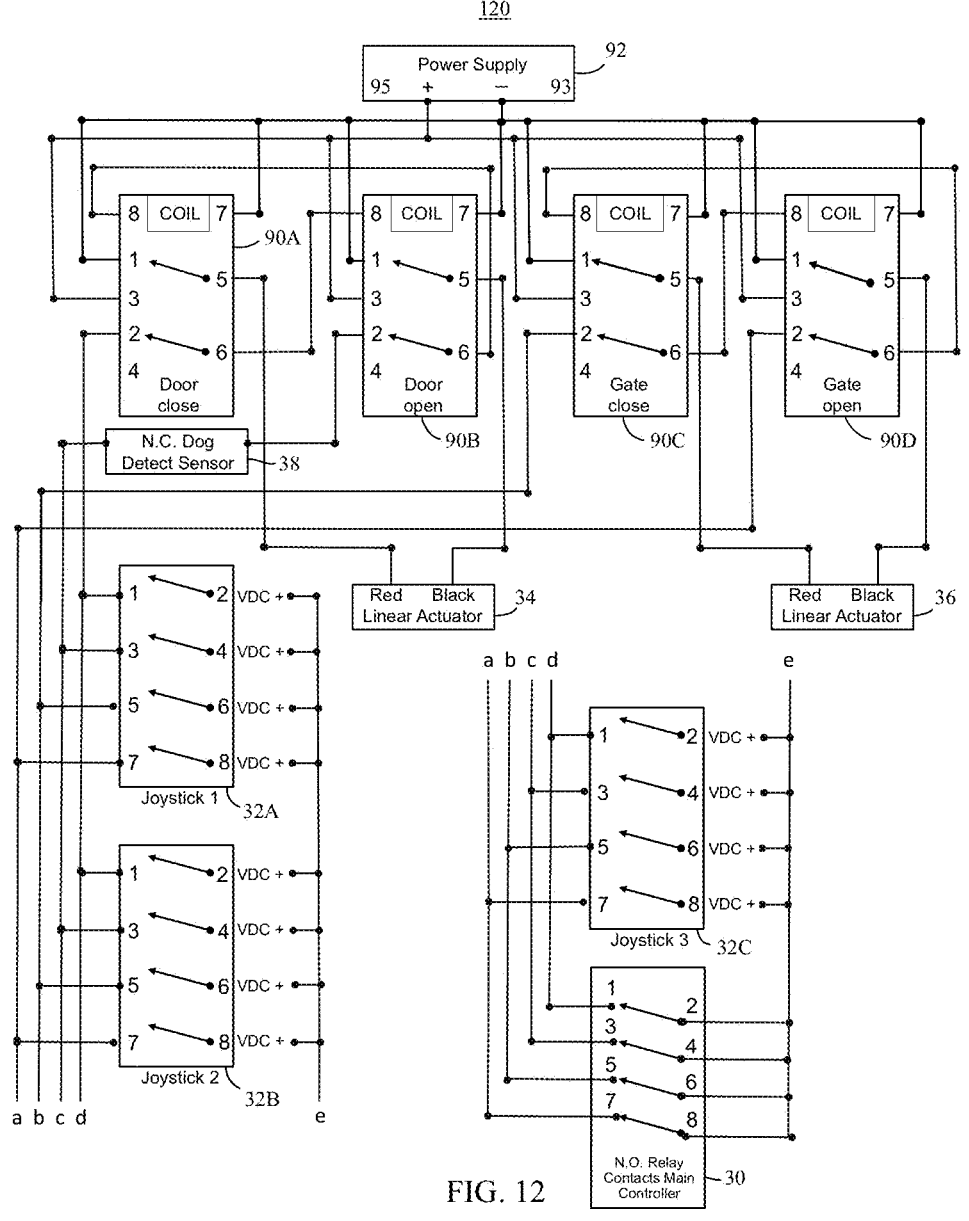

FIG. 12 is a wiring diagram of one embodiment of a control system for an animal management system showing an electrical interlock scheme to prevent more than one controller from actuating the same door simultaneously, according to the present invention.

DETAILED DESCRIPTION OF THE INVENTION

The following disclosure presents exemplary embodiments of an animal management system that can simplify the operation and control of animal kennels or boarding houses, especially large animal kennels with numerous individual kennels for housing numerous animals. The disclosed management system reduces the number of man-hours required by providing for remote control and operation of the individual kennels, which translates into lower operating costs for the animal boarding house in general. For illustration purposes, drawings and descriptions herein focus on structural and control system features using only one, or a small number of exemplary animal enclosures, egress doors, and other system elements. It should be understood that these basic elements can be scaled to construct animal management systems with much larger capacities that can house hundreds or thousands of animals, each housed in individual kennels, and that such scaled-up systems are well within the scope of the present invention.

A basic embodiment of the disclosed animal management system utilizes a main controller electrically coupled to at least one motor, such as a rotary motor but preferably a linear actuator. A sensor may also be in communication with the controller. The sensor may be a user interface that communicates an operator's input at the interface to the main controller to effectuate control of the animal management system. The motor may be mechanically coupled to a kennel door and can be automatically activated in response to an event sensed by the sensor. Alternatively, the main controller may be used for manual operation of the motor from a remote location, such as within a control room found at one end of, or at some other interior location within an animal boarding house.

FIG. 1 is plan view of one embodiment for an animal management system having automated controls. The animal management system 10 includes an interior shelter 12 and an enclosed exterior perimeter 14. The interior shelter 12 includes at least an aisle or hallway 16 and a plurality of kennels 18. Each of the kennels 18, labeled individually A1 to A6, B1 to B6, and C1 to C6 in FIG. 1, has a manually operated gate 20 that separates the kennel 18 from the hallway 16. Each kennel 18 also includes an a corresponding run 22 that is within the enclosed exterior perimeter 14. Each run 22 opens into a yard 24, which is also within the enclosed exterior perimeter 14. Each run 22 is separated from each adjacent run, providing each kennel 18 with a private exterior portion while maintaining the animal's enclosure therein. In some more elaborate embodiments, the interior shelter 12 may also include a control room 11 where customers can check their animal in for boarding and where other administrative tasks may be accomplished.

In some preferred embodiments, the yard 24 may be separated into two or more yards 24a and 24b to allow multiple animals access to the yard while maintaining separation of the animals. As shown in FIG. 1, there are three yards 24a, 24b, and 24c. Each yard 24a, 24b, and 24c serves six kennel-and-run units, as shown. The total number of kennels 18 may be scaled up or down depending on the size of the boarding house operation and needs of the operator. The yards 24a, 24b, and 24c may be separated by a conventional chain link fence or other type of fencing. In the embodiment shown in FIG. 1, three different animals may simultaneously access one of the yards 24a, 24b, or 24c for exercise without comingling with any other animal.

FIG. 2 is a simplified plan view of an embodiment for an animal management system having automated controls. The system shown in FIG. 2 is substantially similar to that illustrated in FIG. 1, having only been scaled down for purposes of illustration. It should be understood that the disclosed invention is not limited in the number of kennels 18 and exterior runs 22; the disclosed invention can be easily scaled up and down to accommodate the specific size of the animal boarding house operation. Preferably, each kennel 18 includes an interior door 26 configured for remote actuation and an exterior door 28 also configured for remote actuation. The interior door 26 separates the kennel 18 from its corresponding run 22 while the exterior door 28 separates that run 22 from the yard 24.

Preferably, a main controller 30 is located within the interior shelter 12. The system 10 also may include one or more local controllers 32 that are located remote from the main controller 30. In the embodiment shown in FIG. 2, there are three local controllers 32 positioned around the interior shelter 12 and the enclosed exterior perimeter 14. For instance, a first local controller 32a may be located within the hallway 16 adjacent to a gate 20. A second local controller 32b may be located along an exterior wall of one of the runs 22, near the interior door 26, for example. A third local controller 32c may be located within the yard 24, preferably adjacent to an exterior door 28. Note that reference numeral 32 may be used herein to refer generally to any one or all of the three local controllers 32a, 32b, and 32c.

In some embodiments, there may be a switch located within the interior shelter 12 for activating and deactivating a day/night feature. In such embodiments, activation of the night feature by flipping the switch will disable the local controllers 32. This serves as a security feature ensuring that control of the interior and exterior doors 26 and 28 can only originate from someone with access to the interior shelter 12 during, for example, non-business hours. When the operator arrives back at the boarding house, the operator may activate the system 10 by flipping the switch to restore power to the local controllers 32. In some embodiments, only those local controllers 32 located outside the interior shelter 12, e.g., local controllers 32b and 32c, are deactivated during the night feature. In further, more elaborate embodiments, the day/night feature may be controlled remotely by a digital switch, for example, using a smartphone device 84 that has software to access to the control system.

As will be explained in more detail below, each of the main controller 30 and the local controllers 32 are in electrical communication with each interior door 26 and each exterior door 28 to control actuation of each specific door. Preferably, the main controller 30 and the local controllers 32a, 32b, and 32c each include at least one interlock that will prevent simultaneous actuation of any one door by more than one such controller. Turning back to FIG. 1, the interlock feature will be briefly described here. If an operator at the main controller 30 actuates the interior door 26 of the A1 kennel 18, a second operator will be prevented from actuating the same interior door from any of the local controllers 32a, 32b, 32c. However, the second operator may actuate any other door of the other A2-C6 kennels 18 and may actuate the exterior door 28 of the A1 kennel 18. The interlock thus prevents a single door from receiving simultaneous, and potentially conflicting or electrically hazardous commands from the different controllers 30 or 32a, 32b, 32c. The specifics of the interlock feature will be described in more detail below when discussing the electrical communications necessary for the present invention.

FIG. 3A to 3C are top, front and side views, respectively, of a single kennel-and-run combination (alternatively a "kennel/run unit") from within the overall animal management system. In preferred embodiments, the interior door 26 is mechanically coupled to a motor 34 that is electrically coupled to each of the main controller 30 and the local controllers 32. In preferred embodiments, the motor 34 is a linear actuator configured to move the door 26 up and down in response to a signal received from the main controller 30 and the local controllers 32.

Each exterior door 28 is also mechanically coupled to a motor 36 that is electrically coupled to each of the main controller 30 and the local controllers 32. The motor 36 for the exterior doors 28 is also preferably a linear actuator configured to move the door 28 up and down in response to a signal received from the main controller 30 and the local controllers 32.

In some preferred embodiments, the motor 34 and motor 36 are mechanically coupled to their respective interior door 26 and exterior door 28 using a removable pin. The removable pin allows the operator to disengage the interior door 26 or exterior door 28 from its respective motor 34 and 36 for manual operation of that door, e.g., manual opening. This ensures the operator can still operate the animal boarding house in the event of a prolonged power outage, albeit with reduced efficiency.

As will be detailed further below, the interior motor 34 and the exterior motor 36 are coupled to a relay box having multiple relays configured for door control. For illustrative purposes, an embodiment described herein includes a relay box having four such relays. In this embodiment, each motor 34 or 36 is coupled to two of the four relays, where one of those two relays corresponds to a retracting or upward or opening actuation and the other relay corresponds to an extending or downward or closing actuation of the respective motor 34 or 36. The relay box is coupled to a local power supply which may be coupled to a 120 volt outlet. Each kennel 18 may have its own relay box containing the four relays. In some embodiments, multiple kennels 18 are powered by a common power supply, such as four or five kennels 18 per power supply. In preferred embodiments, a single power supply may provide power to twelve kennel and run units. In the embodiment illustrated in FIG. 1, a total of two power supplies may provide power for twelve kennel/run units. An exemplary power supply distribution will be detailed further below.

In preferred embodiments, each interior door 26 may include a sensor 38 for detecting presence of an object within the interior door frame while the interior door 26 is open. The sensor 38 may be a passive infrared sensor or other optical or mass sensor that detects the presence of an object. The sensor is electrically coupled and configured to communicate with the main controller 30 and each local controller 32. The sensor 38 is configured to prevent actuation of the interior door 26 while an animal is present within the door frame to prevent injury to the animal. Similarly, each exterior door 28 may include a similar sensor 40 for detecting presence of an object within the exterior door frame while the door 28 is open. The sensor 40 is also electrically coupled and configured to communicate with the main controller 30 and each of the local controllers 32 to prevent actuation of the exterior door 28 when an animal is detected within the exterior door frame. In an alternative embodiment, the sensor 38 may be installed in a lower end of the interior door 26 and the sensor 40 may be installed in the lower end of the exterior door 28. In such embodiments, the sensor may only be activated while the door is open to conserve energy and reduce occurrences of erroneous detections.

FIG. 4A to 4C are top, side and rear views, respectively, of an alternate embodiment of one kennel/run unit from within the overall animal management system. Note, the yard 24 has been excluded from these views but it should be understood that the run 22 opens into the yard 24, as detailed above. In a more elaborate embodiment of the system 10, the enclosed exterior perimeter 14 may include an automated louvered pergola 42. The louvered pergola 42 preferably extends from an exterior wall of the interior shelter 12 and covers each of the runs 22 within the enclosed exterior perimeter 14. The yard 24 remains uncovered. FIG. 4A shows a top view of one kennel 18 having the run 22 covered with louvered pergola 42. The louvers or individual slats 44 are closed in this view. In preferred embodiments, one or more motors 46 are coupled to the louvered pergola 42 and are configured to open and close the individual slats 44. The one or more motors 46 are preferably linear actuators. The one or more motors 46 are electrically coupled to and controlled by the main controller 30 to allow an operator to open and close the louvered pergola 42 depending on the weather conditions.

In another embodiment, an event sensor 48 may be positioned on the roof of the interior shelter 12, within the run 22 or elsewhere within the enclosed exterior perimeter 14. The event sensor 48 is electrically coupled and configured to communicate with the main controller 30. The event sensor 48 preferably measures an environmental event that signals the main controller 30 to actuate the one or more motors 46 to open and close the louvers 44, depending on the event sensed. An event threshold may be stored in the memory of the main controller 30 so that the main controller 30 only responds when the sensed event exceeds the event threshold. For example, the sensor 48 may be a precipitation sensor for detecting rain. In one example, the sensor 48 may detect precipitation, indicating rain, snow or hail, and communicate such detection to the main controller 30. In response to such communication, the main controller 30 actuates the one or more motors 46, causing the louvers 44 to close and thereby cover the runs 22 so animals may still access the exterior without being substantially exposed to the weather. In further embodiments, the sensor 48 may be a temperature sensor so that on hot days, the main controller 30 closes the louvers 44 to provide shade over the runs 22. The sensor 48 may additionally or alternatively, be a wind sensor so that on windy days, the main controller 30 opens the individual slats 44 allowing the animals to enjoy the breeze. In a system 10 such as the one illustrated in FIG. 1 having a plurality of kennels 18, multiple sensors 48 may be deployed so that an algorithm run by the main controller can activate the louvers 44 when a minimum number of sensors exceeds a threshold. In each of the above scenarios, the main controller 30 may store in its memory an event threshold so that actuation of the one or more motors 46 only occurs upon the event sensor 48 detecting an event that exceeds the threshold.

FIG. 5 is a top view of an alternate embodiment of one kennel and run unit from the animal management system. In this illustrated embodiment, an automated heating feature is included with each kennel 18. Preferably, a heating element or heating coils 49 are included in each kennel 18. The heat coils 49 may be integrated into the floor of each kennel 18. The heat coils 49 are electrically coupled to and controlled by the main controller 30. A temperature sensor 50 may be electrically coupled to and configured to communicate with the main controller 30. The temperature sensor 50 is preferably positioned outside the interior shelter 12 for exposure to the external environment. In one example, the sensor 50 may be positioned on a roof of the interior shelter 12 or on top of an exterior wall forming a run 22. The sensor 50 is preferably positioned to be continuously exposed to the environment to obtain an accurate reading of the current outside temperature. In preferred embodiments, the main controller 30 stores in memory a low temperature threshold so that when the temperature sensor 50 communicates a temperature that is below the threshold, the main controller 30 activates the heating coils 49 to heat each kennel 18. In a system 10 such as the one illustrated in FIG. 1 having a plurality of kennels 18, multiple temperature sensors may be deployed so that an algorithm run by the main controller can activate the heating coils when a minimum number of sensors exceeds a threshold.

FIG. 6 is a top view of one kennel/run unit from the animal management system. FIG. 6 illustrates a smoke and fire automated response feature that may be incorporated into the system 10 according to the present invention. Preferably, the interior shelter 12 includes at least one smoke and fire detector 52. The smoke and fire detector 52 is electrically coupled to and configured to communicate with the main controller 30. The smoke and fire detector 52 may be configured to detect the presence of smoke or fire within the interior shelter 12 and communicate such to the main controller 30. In some embodiments, the detector 52 may also include a carbon monoxide detector, as is known for conventional home smoke detectors. In response to the main controller 30 receiving a signal from detector 52 indicating the presence of smoke, fire or high levels of carbon monoxide within the interior shelter 12, the main controller 30 actuates all interior doors 26 for each kennel 18 to allow the animals to escape into their respective run 22 away from the potential hazard. The exterior doors 28 may remain closed upon detection of smoke, fire or carbon monoxide to prevent the animals from comingling unsupervised in the yard 24. Simultaneously with actuating all interior doors 26 open, the main controller 30 may send an electronic alert signal to a registered operator informing the operator of the potential hazard occurring within the shelter 12. The electronic alert signal may be any type of electronic communication, such as an SMS text message, recorded audio message, or email.

FIG. 7A to 7C are top, front, and side views, respectively, of one kennel/run unit from the animal management system. The embodiment of the system 10 illustrated by FIGS. 7A to 7C includes an automated liquid delivery system. The liquid delivery system preferably includes a three valve manifold 54 having three distinct conduits 56, 58, 60 coupled to three different liquid sources 62, 64, 66. The three valve manifold 54 preferably includes three solenoid valves that are electrically coupled and in communication with the main controller 30. The valves of the manifold 54 are maintained in a normally closed position. The main controller 30 may send a signal to one or more of the valves within the three valve manifold 54 to release a liquid into the kennel 18, the run 22 or both. In preferred embodiments, each kennel 18 and run 22 unit includes its own liquid delivery system having its own three-valve manifold 54 with conduits 56, 58, 60 coupling the manifold to the different liquid sources 62, 64, 66 to allow an operator to selectively clean all kennels and runs as desired.

In one embodiment, a water source 62 is configured for fluid communication with the manifold 54 via conduit 56. The water source 62 may be a ground well, city water, or other reservoir. The second liquid may be a sanitizer solution 64 in fluid communication with the manifold 54 via conduit 58 and the third liquid may be an enzyme solution 66 in fluid communication with the manifold 54 via conduit 60. The sanitizer solution 64 and the enzyme solution 66 are preferably stored in drums, e.g., along the exterior of the interior shelter 12. At least one dispenser 68 may be included in the kennel 18 and placed in fluid communication with the manifold 54 for receiving one of the liquids therefrom. The dispenser 68 may be a shower head nozzle or a sprinkler mounted in an upper corner of the kennel 18 to direct a cleaning spray toward the interior floor and the sidewalls of that kennel. In a preferred embodiment, such as that shown in FIG. 7B, a blend box 70 may be coupled to conduit 74 downstream of the manifold 54 and upstream of the dispenser 68. The blend box 70 may be configured to homogeneously mix two or more of the liquid sources 62, 64, and 66 prior to the liquid being released from the dispenser 68. In one example, the main controller 30 may command the valve manifold 54 to open the water source 62 and the sanitizer solution 64 valves, which will allow both the clean water and the sanitizer solution to flow into the blend box 70 where the liquids can homogenously mix before reaching the dispenser 68 for application in a kennel 18.

In addition to dispenser 68 in the kennel 18, the run 22 may also include at least one dispenser 72 in fluid communication with the manifold 54. The dispenser 72 may be a shower head nozzle or a sprinkler mounted above the ground of the run 22. The dispenser 72 may be configured to dispense the liquid in a spray pattern that substantially covers the walls and the ground of the run 22. Alternatively, the dispenser 72 may be a high-pressure nozzle mounted at ground level proximate to the interior door 26. The high-pressure dispenser 72 may be configured to flush the liquids across substantially all of the ground within the run 22. The dispensers 68 and 72 share a common conduit 74 that couples each dispenser 68 and 72 with the upstream blend box 70, allowing simultaneous delivery of liquids to the kennel 18 and to the run 22. The main controller 30 may be configured to control the specific liquid or liquids that are to be delivered to the dispensers 68 and 72.

In more elaborate embodiments, the run 22 may include two dispensers, the first being a shower head nozzle or sprinkler 72 mounted above ground level and the second being a high-pressure nozzle 76 mounted at ground level. A directional valve 78 may be included in the common conduit 74 and may be configured for controlling delivery of the liquid to either the shower head nozzle 72 or the high-pressure nozzle 76. The directional valve 78 may be electrically coupled and in communication with the main controller 30 so that an operator can select from delivery to the shower head nozzle 72 or to the high-pressure nozzle 76.

FIG. 8 is a block diagram of one embodiment of a control system 80 for an animal management system according to the present invention. For illustrative purposes only, minimal components are shown that are capable of providing automatic operation of interior and exterior egress doors for a single kennel-and-run combination (hereafter "kennel/run unit"). It should be understood that this minimal set of components can be scaled up by any desired multiplication factor as needed for larger operations. In this model, a main computer 82 provides a human interface to enable an operator to remotely control all animal egress doors within a facility such as the housing system 10. Main computer 82 may be any modern and conventional personal computer having well-known features such as a microprocessor, power supply, an operating system such as Windows® or macOS®, a video card, RAM, storage memory, display, and user input devices such as a keyboard, mouse, touchscreen, and voice activation, and an ability to load and run software applications using conventional wired and wireless communication ports. In particular, main computer 82 includes a specialized software application 83 that provides a user interface on the display to allow an operator to command a programmable logic controller 30 (hereafter "main controller 30") to operate the animal egress doors.

System 80 preferably also provides one or more auxiliary control nodes 84 capable of executing the same control functions as main computer 82, over all animal egress doors within housing system 10. Auxiliary control nodes 86 may be embodied as additional personal computers that are coupled to a common local area network. For example, the main computer 82 may function as a server running a server OS, and providing a network via wired and/or wireless communication to a plurality of the auxiliary control nodes 84, in a conventional manner. Preferably one or more modem routers 86 are installed at various locations around the management system 10 to provide a roving operator, equipped with a portable auxiliary control node 84, reliable wireless access to the network so that remote control of egress doors may be effected from any point within the interior shelter 12, any of the runs 22, or from a yard 24. The portable auxiliary control node 84 may be a touch-screen device such as an iPad®, an Android® tablet device, or a conventional smart phone. The portable auxiliary control node 84 may include software application 83, to display the user interface for control of egress doors on the auxiliary control node. In another embodiment, the portable auxiliary control node 84 may remotely access application 83 running on main computer or server 82. When used for control, an auxiliary control node 84 acts as the main controller 30.

In system 80, main computer 82 is configured to issue door commands via main controller 30. In one embodiment, system 80 may include a single main controller 30 for controlling a large-scale animal management system having 200 or more kennels. For example, in management system 10, the most basic unit of controlled space for an animal is a single kennel/run unit that includes the interior door 26 and the exterior door 28. Each of these doors has two states (open and closed) and each of these states is achieved by actuating a relay contact to energize an actuator that physically moves the door. Each kennel/run unit can therefore be assigned four output pins from main controller 30, each pin representing a command signal to (1) open the interior door, (2) close the interior door, (3) open the exterior door, or (4) close the exterior door. In one example, main controller 30 may be a Control-by-Web model MX600 programmable logic controller that provides 1,024 i/o ports-sufficient to control 256 two-door kennel/run units.

In response to commands issued by an operator manipulating software application 83 via the user interface of main computer 82 or an auxiliary node 84, the main controller 30 energizes output ports that are associated with whichever doors the operator intends to actuate. Each interior door in a particular kennel/run unit may have two addresses-one to open the door and another to close the door. Each exterior door will also have two such addresses. Commands from main controller 30 may be directed to each address using a relay expansion module 87, such as a Control-by-Web X-12S module. For example, address A1 may designate the command to open the interior door in kennel/run unit A; address A2 to close the interior door in kennel/run unit A; address A3 to open the exterior door in kennel/run unit A; and address A4 to close the exterior door in kennel/run unit A. Similarly, addresses B1, B2, B3 and B4 may designate commands to respectively open interior, close interior, open exterior, and close exterior doors in kennel/run unit B. A single relay expansion module 87 may provide addresses for a single kennel/run unit, or for multiple kennel/run units, depending on capacity. Additional relay expansion modules 87 may be added to system 80, as needed, for scaling purposes.

Commands to open and close egress doors for a particular kennel/run unit may also originate from one or more local controllers 32. In the embodiment modeled in FIG. 8, three such local controllers are shown—a first local controller 32A is installed in the aisle near the interior entrance to the kennel/run unit; a second local controller 32B is installed on an exterior wall adjacent to the interior door of the same kennel/run unit; and a third local controller 32C is installed at an exterior location adjacent to the exterior door of the same kennel/run unit. Local controllers 32A, 32B, 32C may be referred to collectively or generally as local controller 32. In one embodiment, each local controller 32 may be a manual switch having at least four switch positions. For example, the manual switch may be a joystick having switch positions up, down, left, and right for actuation, and a non-actuating center position to which the joystick automatically returns when not actuated. Each of these four actuating positions corresponds to a similar command signal issuing from the main controller 30, i.e., (1) open the interior door, (2) close the interior door, (3) open the exterior door, or (4) close the exterior door. In one example, the local controller 32 may be a YXQ AC380V 5A 4NO momentary type monolever.

A command to open or close an egress door may thus originate from the main controller 30 or from any one of the local controllers 32. For any particular kennel/run unit, command signals carried from main controller 30 or from a local controller 32 terminate at a common junction box 88. An electrical interlock, described below in further detail, prevents more than one controller from actuating the same door simultaneously. In general, when any one controller closes a switch to issue an actuation command, all other controllers capable of issuing the same command are locked out by an interlocked relay contact. An actuation command, when issued, energizes a coil in relay module 90 to cause closure of a contact in a higher-power circuit that is isolated from the controllers. Closure of the relay contact connects power supply 92 across one of the linear actuators 34 or 36 to move the corresponding egress door to an open or closed position. Once the linear actuator has moved the door fully open or fully closed, power to the actuator may be disconnected by various means, such as by a predetermined timeout programmed into software 83, by manually releasing the joystick, or by a limit switch integral to the linear actuator. In one embodiment, an intermediate position of an egress door, between fully open and fully closed, may be achieved by early manual release of the joystick. In another embodiment, mere jogging of the joystick to one of its actuating positions causes a full change of state of an egress door.

The power supply 92 may have any electrical rating consistent with good engineering practice. In one exemplary embodiment, power supply 92 may be a Mean Well model NDR-480-24 industrial DIN rail power supply rated at 24 VDC, 20A with 120 VAC input. Linear actuators 34 and 36 may be Progressive Automation model PA-15. Other power ratings (e.g. 6 VDC, 12 VDC, 120 VAC) are possible within the scope of the invention.

FIG. 9 shows a schematic for relay 90, which in this example is a 24 VDC DPDT relay. The contacts are shown in the unenergized or shelf condition, in which no power is applied across the coil terminals #7 and #8, contacts #1 and #5 are connected, and contacts #2 and #6 are connected. When power is applied across terminals #7 and #8, the contacts change state so that #3 and #5 are connected, and #4 and #6 are connected.

FIG. 10 shows a schematic for a local controller 32, which in this example is a four-position NO SPST joystick switch. Motion of the joystick in any one of the up, down, left or right directions closes the corresponding contacts. Movement up closes #1 to #2 to open the interior door. Movement down closes #3 to #4 to close the interior door. Movement left closes #5 to #6 to open the exterior door. Movement right closes #7 to #8 to close the exterior door. In the non-actuated or shelf condition, the joystick is idle and all contacts are open.

FIG. 11 shows a block diagram for linear actuator 34 or 36, which in this example is a 24 VDC linear motor. The linear actuator 34 has two power terminals denoted RED and BLACK. Placing a positive 24 VDC on the RED terminal and grounding the BLACK terminal causes the linear actuator to extend. Reversing the polarity causes the linear actuator to retract.

FIG. 12 shows an electrical schematic for one embodiment of a system of interlocking controls 120 for enabling multiple controllers to operate egress doors without conflict for an animal management system according to the invention. In system 120, power supply 92 is shown at the top of the schematic. The power supply has a positive terminal 95 and a negative terminal 90. Below the power supply 90 there are four relays 90A, 90B, 90C and 90D all of identical form. Relay 90A is dedicated to powering linear actuator 34 to open interior door 26. Relay 90B is dedicated to powering linear actuator 34 to close interior door 26. Relay 90C is dedicated to powering linear actuator 36 to open exterior door 28. Relay 90D is dedicated to powering linear actuator 36 to close exterior door 28. When power is applied across the red and black terminals of either actuator 34 or 36, the actuator moves its respective door open or closed, depending on the polarity.

The switch contacts of the main controller 30 and local controllers 32A, 32B, 32C are modeled beneath the relays. Note that switch contacts of the main controller 30 represent either control signals issued by the main controller 30 directly or via an expansion module 87. In any of local controllers 32A, 32B, 32C, preferably only one of the four switch contacts may be operated at a time, which is ensured by mechanical interlock when the local controller 32 is the joystick operating as shown in FIG. 10. Switch contacts of main controller 30 correspond to the order of operations described for the local controllers 32.

To illustrate operation of the control circuit of FIG. 12 and the electrical interlock, start at local controller 32A. Local controller 32A is located in the aisle adjacent to a kennel/run unit that an operator decides to control. At start, all local controllers are in a non-actuating condition and the interior door to the kennel/run unit is closed. The operator now moves the joystick up to close contact #1 to #2, thereby energizing contact #1 with positive voltage. Because the coil of relay 90A is de-energized, its contacts #2 to #6 are closed which energize the coil of relay 90B at its contact #8. This closes relay 90B contact #3 to #5 which energizes linear actuator 34 causing it to retract and open the interior door 26. Energization of relay 90B also opens contact #2 to #6 which locks out all #3 contacts among all controllers 32A, 32B, 32C and 30 to defeat any simultaneous attempt to close the interior door 26.

With the interior door now open and all local controllers in a non-actuating condition, an operator can decide to close the interior door using any of the controllers. For example, the operator is now at local controller 32B outside the kennel/run unit near the interior door. The operator moves the joystick down to close contact #3 to #4. In an embodiment wherein system 120 includes an object sensor 38, as long as there is nothing obstructing the interior door (such as a dog or other animal), the object sensor 38 maintains conductivity across its terminals, e.g. its NO contacts remain closed. Closure of contacts #3 to #4 therefore places positive voltage at closed contacts #2 to #6 of relay 90B and across coil terminals #8 to #7 of relay 90A, energizing the coil. This causes closure of relay 90A contacts #3 to #5 which reverses the polarity at the terminals of linear actuator 34 causing it to extend and close the interior door 26. Energization of relay 90A also opens contact #2 to #6 which locks out all #1 contacts among all controllers 32A, 32B, 32C and 30 to defeat any simultaneous attempt to open the interior door 26.

In similar operations, manipulation by an operator of a controller to close contacts #5 to #6 will energize relay 90D, energize linear actuator 36 to retract and open the exterior door 28, and simultaneously lock out all #7 contacts among all controllers to defeat a simultaneous attempt to close the exterior door 28. Similarly, closure of any contact pair #7 to #8 will energize the 90C relay, energize linear actuator 36 to extend and close the exterior door 28, and simultaneously lock out all #5 contacts to defeat any simultaneous attempt to open the exterior door 28.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for housing animals, having an interior shelter and an enclosed exterior, the system comprising:
   (a) within the interior shelter:
      a first kennel;
      at least one second kennel; and
      an aisle adjacent to and providing access to the first kennel and the at least one second kennel;
   (b) within the enclosed exterior:
      a first run;
      at least one second run; and
      an uncovered yard accessible by each of the first run and the at least one second run, the first run and the at least one second run located between the interior shelter and the uncovered yard;
   (c) an interior door separating the first kennel from the first run;
   (d) an exterior door separating the first run from the yard;
   (e) a main controller and one or more local controllers, each controller configured to actuate the interior door and the exterior door, the one or more local controllers each configured for manual actuation; and
   (f) a combination of electrical and mechanical interlocks, of which at least one electrical interlock prevents simultaneous actuation of the interior door or the exterior door by more than one of the main controller and the one or more local controllers, and of which at least one mechanical interlock prevents simultaneous actuation of the interior door and the exterior door by any one of the local controllers.

2. The system of claim 1, wherein the interior shelter further comprises a plurality of kennels arranged along the aisle.

3. The system of claim 2 further comprising:
   a plurality of runs within the enclosed exterior; and
   a plurality of interior doors;
   wherein each one of the plurality of kennels accesses, via only one of the interior doors, only one of the plurality of runs.

4. The system of claim 3, wherein each interior door is configured for actuation by the main controller and the one or more local controllers.

5. The system of claim 4, wherein each one of the plurality of runs accesses the yard via at least one exterior door.

6. The system of claim 5, wherein each exterior door is configured for actuation by the main controller and the one or more local controllers.

7. The system of claim 1, wherein the main controller is located within the interior shelter.

8. The system of claim 1, wherein at least one of the one or more local controllers is located within the yard.

9. The system of claim 8, wherein a second of the one or more local controllers is located along an interior wall of the aisle.

10. The system of claim 9, wherein a third of the one or more local controllers is located along an exterior wall of the first run.

11. The system of claim 1, wherein each of the one or more local controllers comprises a four-position joystick controller.

12. The system of claim 11, wherein each position on the four-position joystick controller corresponds to a specific command to actuate either the interior door or the exterior door.

13. The system of claim 12, wherein a first position on the four-position joystick controller actuates the interior door upward, a second position actuates the interior door downward, a third position actuates the exterior door upward, and a fourth position actuates the exterior door downward.

14. The system of claim 1, wherein the interior door comprises a sensor configured to detect presence of an object under the interior door and prevent the main controller and the one or more local controllers from actuating the door while the object is detected.

15. The system of claim 1, wherein the exterior door comprises a sensor configured to detect presence of an object under the exterior door and prevent the main controller and the one or more local controllers from actuating the door while the object is detected.

16. The system of claim 1, wherein the at least one second kennel comprises a second interior door configured for actuation by the main controller and the one or more local controllers.

17. The system of claim 1, wherein the at least one second kennel further comprises a second exterior door configured for actuation by the main controller and the one or more local controllers.

18. The system of claim 1, wherein each of the first kennel and the at least one second kennel further comprise a gate separating each kennel from the aisle.

19. The system of claim 1, wherein each of the interior door and the exterior door further comprise a linear actuator electrically coupled to the main controller and the one or more local controllers.

* * * * *